United States Patent [19]

van der Lely

[11] 4,014,272
[45] Mar. 29, 1977

[54] CULTIVATORS

[76] Inventor: Cornelis van der Lely, 7, Bruschenrain, Zug, Switzerland

[22] Filed: May 2, 1975

[21] Appl. No.: 574,248

[30] Foreign Application Priority Data

May 3, 1974 Netherlands ............... 7405945

[52] U.S. Cl. .................................. 111/65; 172/59
[51] Int. Cl.² .......................................... A01B 33/00
[58] Field of Search ............... 172/59, 110–112, 172/776; 111/85, 6–7, 1, 65

[56] References Cited

UNITED STATES PATENTS

| 2,651,246 | 9/1953 | Peters et al. | 172/111 X |
| 3,701,327 | 10/1972 | Krumholz | 111/85 X |
| 3,826,314 | 7/1974 | van der Lely et al. | 172/59 |
| 3,902,560 | 9/1975 | van der Lely | 172/59 |

FOREIGN PATENTS OR APPLICATIONS 1,075,353  10/1954  France ............................ 172/59

*Primary Examiner*—Robert E. Bagwill
*Attorney, Agent, or Firm*—Mason, Mason & Albright

[57] ABSTRACT

A cultivator has a row of soil working members or rotors mounted on axis shafts journalled on a frame portion. Each rotor has a single rotatable downwardly extending tine that is offset with respect to its axis shaft of rotation to work a diameter that is less than the spacing between adjacent axis shafts. Thus, unworked strips of soil are left between worked strips after the cultivator has traveled. A mechanism for depositing material is located to the rear of the soil working members and the mechanism includes delivery devices mounted on a common support that is linked to the frame portion by respective parallelogram linkages. The delivery devices can be drills positioned in line with the soil working members to deposit material selectively in the worked strips. Rear wheels can be attached to each linkage at the rear thereof so that each drill follows ground undulations.

10 Claims, 3 Drawing Figures

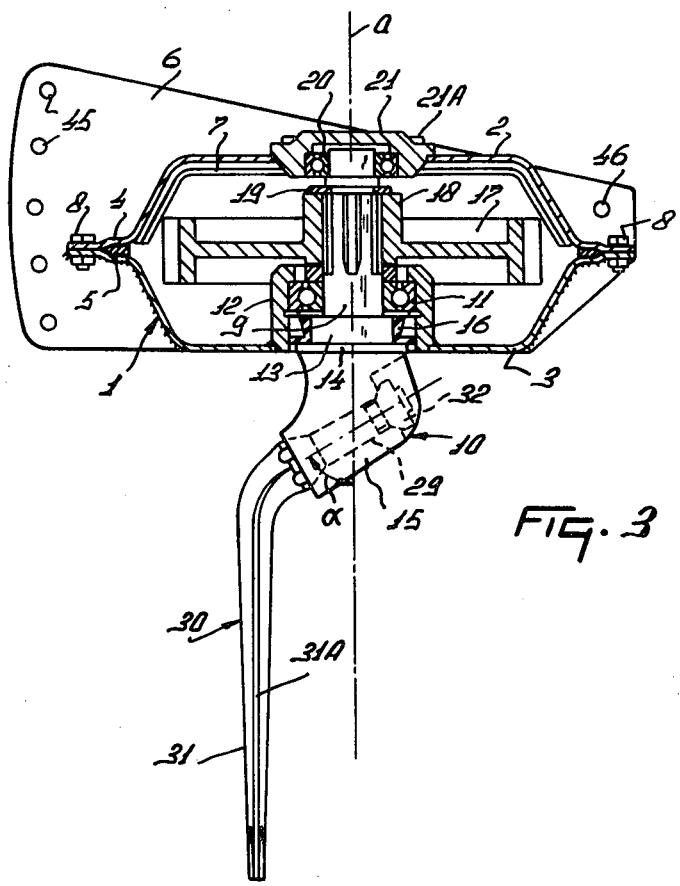

CULTIVATORS

According to one aspect of the invention, there is provided a cultivator of the kind set forth, wherein mechanism for depositing material onto and/or into the ground is provided behind the soil working members with respect to the intended direction of operative travel of the cultivator, said soil working members and said mechanism being so arranged that the members work spaced strips of land during the operation of the cultivator and said mechanism deposits material onto and/or into those strips.

Figure 1:
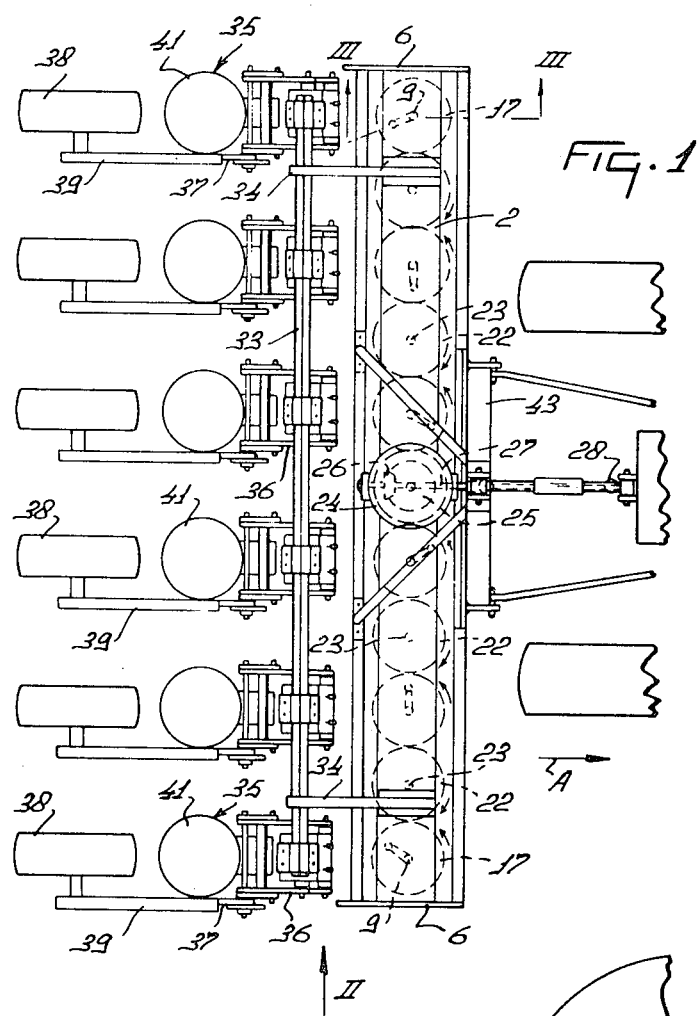
Figure 2:
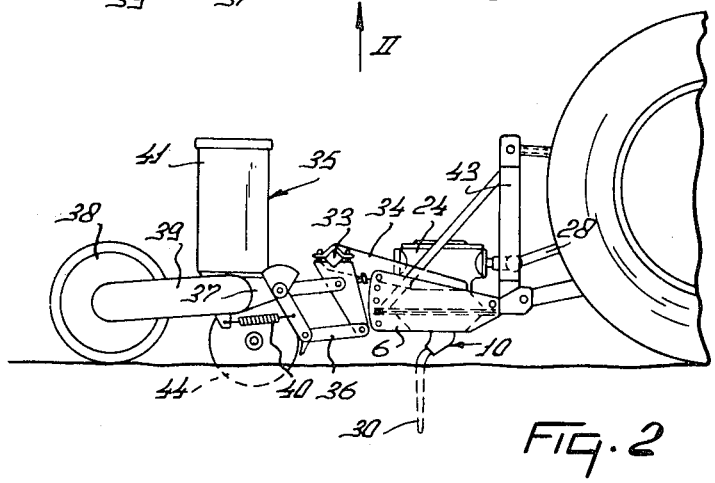

For a better understanding of the invention, and to show how the same may be carried into effect, reference will now be made, by way of example, to the accompanying drawings, in which:

FIG. 1 is a plan view of a soil cultivating implement or cultivator in accordance with the invention, part of which is in the form of a rotary harrow, connected to the rear of an agricultural tractor, FIG. 2 is a side elevation as seen in the direction indicated by an arrow II in FIG. 1, and FIG. 3 is a section, to an enlarged scale, taken on the line III—III in FIG. 1.

Referring to the drawings, the soil cultivating implement or cultivator that is illustrated, and part of which is in the form of a rotary harrow, will hereinafter be referred to only as a cultivator for the sake of brevity. The cultivator has a hollow box-shaped frame portion 1 that extends substantially horizontally transverse, and normally substantially horizontally perpendicular, to the intended direction of operative travel of the cultivator which is indicated by an arrow A in FIG. 1 of the drawings. The frame portion 1 comprises identical upper and lower portions 2 and 3 that are both of substantially U-shaped cross-section, the upper portion 2 being inverted with respect to the lower portion 3. The webs or bases of the upper and lower portions 2 and 3 are both substantially horizontally disposed and are in substantially parallel relationship with one another. The limbs of the substantially U-shaped, in cross-section (FIG. 3), portions 2 and 3 both diverge away from their webs or bases with the result that the assembled frame portion 1 is of substantially hexagonal, although not regular hexagonal, cross-section. The free edges of the limbs of both the upper portion 2 and the lower portion 3 are bent over to form rims 4 that bear against each other throughout parts of their widths when the frame portion 1 is assembled, said rims 4 being substantially parallel to the webs or bases of the two upper and lower portions 2 and 3. It can be seen from FIG. 3 of the drawings that the rims 4 include regions that are off-set respectively downwardly and upwardly relative to regions thereof that are in abutting contact, said offset regions being located inwardly of the abutting regions with respect to the center of the whole frame portion 1.

The offset and therefore relatively spaced regions of the rims 4 have a gasket 5 or other sealing material between them. The opposite ends of the lower portion 3 of the hollow frame portion 1 comprise substantially vertical sector plates 6 that both extend substantially parallel to the direction A. The sector plates 6 project beyond the frame portion 1 at the top of the latter and at both the front and rear thereof with respect to the direction A (see FIG. 3). The side of each sector plate 6 that faces inwardly of the hollow frame portion 1 is provided with a rib 7 for co-operation with the corresponding end of the upper frame portion 2, a gasket or other sealing material preferably being interposed between each rib 7 and the upper frame portion 2. Vertically aligned holes are formed in the abutting regions of the rims 4 and short bolts 8 are entered through these holes to secure the upper portion 2 firmly, but readily releasably, to the lower frame portion 3.

The frame portion 1 rotatably carries a plurality of shafts 9, of which there are six in the example that is being described, said shafts 9 affording the axes of rotation $a$ of corresponding soil working members that are generally indicated by the reference 10 in the accompanying drawings. Each axis $a$ is vertically or substantially vertically disposed and immediately neighbouring axes $a$ are spaced apart from one another in a single row by regular distances which, it is preferred, should have magnitudes of substantially 50 centimeters. The lower ends of the shafts 9 project from beneath the bottom of the lower frame portion 3 and are rotatably supported from that frame portion by corresponding ball bearings 11. Each bearing 11 is accommodated in a corresponding bearing housing 12 which is rigidly secured to the lower frame portion 3, said bearing housings 12 being disposed substantially wholly internally of the frame portion 1. In fact, each bearing housing 12 has a corresponding lower rim that seats in a hole in the web or base of the lower frame portion 3 in such a way that, when assembled, the lower surface of each rim is substantially flush with the lower outer surface of the web or base of the lower frame portion 3. Each shaft 9 is formed with a shoulder 13 at a location beneath the corresponding bearing 11 and with a ring or land 14 that follows the shoulder 13 beneath the latter. The ring or land 14 adjoins a narrow region of a corresponding tine mounting which is generally indicated by the reference 15. Each mounting 15 also comprises a corresponding sleeve-like tine holder. The narrow regions of the mountings 15 are of substantially oval cross-section and the holders have corresponding central openings or bores which receive the fastening portions 29 of corresponding soil working tines 30 that will be further described below.

A sealing ring 16 surrounds each shoulder 13, immediately above the corresponding ring or land 14, at a location just inside the corresponding housing 12. The housings 12 are fixedly secured inside the hollow frame portion 1 by welding and the top of each of them is formed with a hole through which the corresponding shaft 9 passes. That part of each shaft 9 that is located above the corresponding housing 12 inside the hollow frame portion 1 is splined for co-operation with internal splines in the hub of a corresponding straight- or spur-toothed pinion 17. As can be seen in outline in FIG. 1 of the drawings, the sizes of the six pinions 17, and of five similar pinions 22 that are arranged alternately between the pinions 17, are such that the teeth of each pinion are in mesh with those of its immediate neighbour, or both of its immediate neighbours, in the single row of eleven thereof. It will be noted from FIG. 3 of the drawings that the pinions 17 and 22 are located at substantially the same horizontal level as that of the junction between the upper and lower frame portions 2 and 3. In the illustrated embodiment, a plane containing the abutment surfaces of the rims 4 also contains a point on each tooth of each pinion 17 or 22 that is midway between the uppermost and lowermost end of that tooth, said plane extending substantially horizontally perpendicular to all of the axes of rotation $a$. The top of each pinion 17 and 22 has a central upwardly projecting hub 18 whose upper end bears against the lower surface of a corresponding circlip 19 that is engaged in a groove in the corresponding shaft 9 or in a shaft 23 that corresponds to each of the five pinions 22. The uppermost end of each shaft 9 or 23 is of reduced diameter as compared with the splined region thereof and co-operates with the inner race of a corresponding ball bearing 20. The outer race of each ball bearing 20 is accommodated in a corresponding housing 21 which has a rim that seats in a hole formed in the web or base of the upper frame portion 2, four bolts 21A being employed to secure the rim of each housing 21 firmly but releadably to the upper portion 2 of the frame portion 1. It will be noted that the holes in the upper and lower frame portions 2 and 3 that receive the corresponding bearing housings 12 and 21 are of the same size and are similarly located. This considerably simplifies manufacture of the hollow frame portion 1 since the upper and lower portions 2 and 3 thereof may be completely indentical and be formed from sheet material which preferably has a thickness of substantially 5 millimeters.

The five pinions 22 that are alternately arranged between the six pinions 17 are identical to those pinions 17 and the five shafts 23 upon which said pinions 22 are mounted are identical to the six shafts 9 except that none of the shafts 23 projects from beneath the bottom of the frame portion 1. The central shaft 23 of the row of 11 shafts 9 and 23 has an upward extension into a gear box 24 that is mounted on top of the hollow frame portion 1. The upward extension of the central shaft 23 carries a bevel pinion or crown wheel 25 inside the gear box 24 and the teeth of that bevel or crown wheel 25 are in driven mesh with those of a smaller bevel pinion 26 secured to a substantially horizontally shaft 27 that is substantially parallel to the direction A and whose leading splined or otherwise keyed end projects from the front of the gear box 24 to act as a rotary input shaft of the cultivator. An intermediate telescopic transmission shaft 28, which is of a construction that is known per se, is employed, during the use of the cultivator, to place the leading end of the rotary input shaft 27 in driven connection with the power take-off shaft of an operating tractor or other vehicle, said transmission shaft 28 having universal joints at its opposite ends.

The central opening or bore of each tine mounting 15 has its longitudinal axis in inclined but intersecting relationship with the longitudinal axis $a$ of the corresponding shaft 9 which axis $a$ is, of course, also the axis or rotation of the soil working member 10 concerned. The angle that is enclosed between these two axes is indicated in FIG. 3 of the drawings by the reference $\alpha$ and it has a magnitude which it is preferred should not be less than substantially 45°. The fastening portion 29 of each tine 30 is integrally connected by a curved junction to a corresponding active or soil working tine portion 31. Considered towards its free end from the integral junction between the two portions 29 and 31, the portion 29 comprises a first tapering part that is arranged to co-operate with a matchingly shaped part of the central bore of the corresponding mounting 15 and a subsequent second less steeply tapering part whose axial length is, however, substantially three times that of the first and more steeply tapering part. Finally, a free end part of the fastening portion 29 is formed with an external screw-thread that is arranged to receive a frusto-conically faced fastening nut 32. When tightened, the nut 32 firmly retains the fastening portion 29 of the corresponding tine 30 in its mounting 15, the tapering parts of the tine fastening portion 29 co-operating with the walls of the central bore of that mounting in such a way as to prevent the tine 30 from turning about the longitudinal axis of its own fastening portion 29 relative to the mounting 15 during operation. It will be seen from FIG. 3 of the drawings that the fastening nut 32 and the extreme free end of the screw-threaded part of the tine fastening portion 29 are protectively received inside a recess that is formed in the material of the tine mounting 15 in communication with the upper end of the central bore that extends through that mounting.

Each tine 30 is of a polygonal cross-section at the integral junction between its fastening portion 29 and its active or soil working portion 31, it being preferred that said cross-section should be of substantially regular hexagonal configuration. In fact, it is also preferred that the six corners of the cross-section should be rounded off and that the six "flats" between the corners of the cross-section should be formed with corresponding inwardly curved recesses. The recesses in question extend lenghtwise along the tapered parts of the tine fastening portion 29 but become progressively smaller towards the screw-threaded free end part in which part they finally terminate. The recesses also extend short distances beyond the integral junction between the portions 29 and 31 into the latter portion 31 and the end regions of two of them are visible in FIG. 3 of the drawings. Considered lengthwise of each active or soil working tine portion 31 from its integral junction with the corresponding fastening portion 29, said portion 31 is initially in rectilinear alignment with the fastening portion 29 but this upper rectilinear part is very short and is followed by the downwardly directed curved junction beyond which said portion 31 again becomes substantially straight down to its free end or tip the latter straight part being in parallel, or substantially parallel, relationship with the axis of rotation $a$ of the corresponding soil working member 10. The active or soil working portion 31 tapers gently towards its free end or tip from its integral junction with the fastening portion 29 and the initial preferred basically regular cross-section progressively changes, beneath the curved junction, into a basically rectangular cross-section. The rectangular cross-section is progressively flattened towards the free end or tip of the portion 31 in such a way that, at and near that free end, diagonals between the opposite corners of the rectangular cross-section have a length ratio of substantially 1:2. The longer of those diagonals extend substantially tangentially with respect to a circle centered upon the corresponding axis of rotation $a$.

In a short lower free end or tip region of each active or soil working tine portion 31, longitudinally extending recesses or grooves are formed in the what would otherwise be flat sides of the cross-section thereof. Said recesses or grooves extend upwardly along the portion 31 from the extreme free end or tip thereof and merge into the four flat sides of the portion 31 at their upper ends. The front "corner" of each active or soil working tine portion 31 with respect to the intended direction of operative rotation of the corresponding soil working member 10 is flattened to form a leading rib 31A (FIG. 3), the other three corners of said portion 31 all being rounded off. The dimensions of each soil working member 10 are such that, during rotation thereof about the corresponding axis *a*, the free end or tip of the corresponding tine portion 31 follows a circular path having a diameter of substantially 10 centimeters so that the member 10 concerned will work a strip of land of substantially the same width.

A support 33 of substantially square cross-section extends parallel to the hollow frame portion 1 behind the latter with respect to the direction A throughout substantially the whole of the transverse length of that frame portion. The support 33 is connected by brackets 34 to the top of the frame portion 1 towards the opposite lateral ends of that portion. A mechanism 35 for depositing material onto and/or into the ground is secured to the support 33 so as to lie behind a corresponding one of the six soil working members 10 as considered in the direction A. In the particular example that is being described, the six individual mechanisms 35 are all precision seed drills. Each mechanism 35 is, however, connected to the common support 33 by a corresponding parallelogram linkage 35 so that the mechanism 35 is movable upwardly and downwardly relative to the frame portion 1. A small frame 37 is connected to the rear upwardly and downwardly movable portion of each parallelogram linkage 36 and each frame 37 bears upon the ground surface by way of a corresponding broad ground wheel 38 rotatably disposed at the rear of the mechanism 35 concerned on an arm 39 in the form of a transmission casing, that is coupled to the corresponding frame 37. Each arm 39 accommodates a transmission from the corresponding ground wheel 38 to a delivery disc at the bottom of a seed hopper 41 of the relevant mechanism 35. A tension spring 40 extends between each parallelogram linkage 36 and the corresponding arm 39 and normally maintains that arm in contact with a stop that is not visible in the drawings. In the embodiment which is being described by way of example, seeds are actually deposited in the ground by the drills of the mechanism 35 at locations which are not less than substantially 50 centimeters to the rear in the direction A, of the paths of rotation of the tines 30 of the corresponding soil working members 10. With the spacing of the soil working members 10 that is provided in the described embodiment seeds from the hoppers 41 are sown in individual rows that are spaced apart from one another by strips of ground having widths of substantially 40 centimeters. The front of the frame portion 1 of the part of the cultivator that is in the form of a rotary harrow is provided with a coupling member or trestle 43 of generally triangular configuration by which said frame portion 1 can be connected to the three-point lifting device or hitch at the rear of an agricultural tractor or other operating vehicle in the generally known manner which is indicated in outline in FIGS. 1 and 2 of the drawings.

In the use of the cultivator that has been described, its coupling member or trestle 43 is connected to the three-point lifting device or hitch at the rear of an agricultural tractor or other operating vehicle and the rotary input shaft 27 is placed in driven connection with the power take-off shaft of the same tractor or other vehicle by way of the intermediate telescopic transmission shaft 28. As the cultivator moves operatively in the direction A over land that is to be cultivated and concurrently sown with seed, the shafts 9 and 23 are rotated from the gear box 24 in the directions that are indicated by small arrows in FIG. 1 of the drawings so that, as will be evident from those arrows, each soil working member 10 rotates in the same direction as do all the other members 10. Each member 10 works a strip of land having a width of substantially 10 centimeters and those strips of land are spaced apart from one another by broader unworked strips which each have a width of substantially 40 centimeters. The six mechanisms 35, in the form of precision seed drills, deposit seeds from their hoppers 41 in the worked strips of soil. Each mechanism 35 incorporates its own furrow opener which is in the form of a pair of soil-cutting discs 44 (FIG. 2). The opened and sown furrows are subsequently closed by the six broad ground wheels 38 each of which has a flexible ground-engaging tyre. The seeds are sown in the opened furrows by the aforementioned delivery discs (not shown) at the bottoms of the hoppers 41, said delivery discs being operated at a speed which is dependent upon the rate of travel of the cultivator over the ground, said discs being driven by rotation of the corresponding ground wheels 38. With the described and illustrated construction, only those strips of soil are worked in which seeds are actually to be sown so that, naturally, the cultivator operates in a less power-consuming manner than would a cultivator that worked a single broad strip of land substantially corresponding to its own path of travel. The described and illustrated cultivator works very effectively producing good results with a very significant reduction in power consumption as compared with known cultivators of the kind that have been discussed immediately above. Even on quite undulating ground, the semi-floating suspension of each mechanism 35 enables that mechanism to follow the ground contours closely entirely independently of the other mechanisms 35.

The mechanisms for depositing material onto and/or into the ground that have been described could be replaced by distributors for powdered or granular artificial fertilisers or the like or by mechanisms for planting tubers, young plants and so on in the soil. It will be noted from FIG. 3 of the drawings that the two sector plates 16 at the lateral ends of the hollow frame portion 1 are formed with curved rows of holes 45 at their rearmost edges and with single holes 46 at the front, the centers of curvature of the rows of holes 45 coinciding with the corresponding holes 46. The holes 46 are capable of receiving substantially horizontally aligned pivot bolts about which arms may be mounted so as to be turnable alongside the plates 6. Those arms are provided with locking pins or retaining bolts for co-operation with chosen holes 45 to retain said arms in corresponding angular settings about a pivotal axis coinciding with the position of the holes 46. Upon removing the mechanisms 35, a rotary supporting member in the form of a ground roller can be rotatably mounted between the rearmost ends of the two arms so as to roll over the ground surface behind the soil working members 10. With such an arrangement, the particular holes 45 that are chosen for co-operation with the locking pins or lock bolts are a principal factor in determining the depth of penetration of the tines 30 into the soil which takes place during the operation of the cultivator.

Although various features of the cultivator that has been described and/or that are illustrated in the accompanying drawings will be set forth in the following claims as inventive features, it is emphasized that the invention is not necessarily limited to those features and that it includes within its scope each of the parts of the cultivator that has been described and/or that is illustrated in the accompanying drawings both individually and in various combinations.

What I claim is:

1. A cultivator comprising a frame movable over the ground and a plurality of rotatable soil-working members supported on a portion of said frame and said members being positioned in a row that extends transverse to the direction of travel, said soil-working members each including a downwardly extending tine and driving means connected to rotate said members and the corresponding tines about substantially vertical axes, said tine of each soil-working member being driven through a circular path about its axis of rotation to work a strip of land during travel, the spacing between the axes of rotation of adjacent soil-working members exceeding the working widths of the tines of adjacent members and said members being positioned to work strips of land spaced apart from one another between unworked strips, devices for depositing material on the worked strips being supported on said cultivator and each of said devices being positioned to the rear and in line with each said member, with respect to the direction of travel.

2. A cultivator as claimed in claim 1, wherein said devices are connected to a common support secured to said frame portion.

3. A cultivator as claimed in claim 2, wherein each of said devices is independently connected to said frame portion by a parallelogram linkage and said device is movable upwardly and downwardly relative to said frame portion through said linkage.

4. A cultivator as claimed in claim 1, wherein each tine comprises a soil-working portion that extends substantially parallel to the axis of rotation of its corresponding soil-working member and a fastening portion that is substantially inclined to that axis of rotation.

5. A cultivator as claimed in claim 1, wherein said frame portion comprises two substantially identical portions that are interconnected in a substantially symmetrical arrangement.

6. A cultivator as claimed in claim 5, wherein said frame portion is substantially hexagonal in cross-section.

7. A cultivator as claimed in claim 1, wherein said tines are positioned in angularly staggered relationship from one another around their corresponding axes of rotation.

8. A cultivator as claimed in claim 7, wherein the magnitude of angular staggering position of the tines of two immediately adjacent soil-working members is about 60°.

9. A cultivator comprising a frame movable over the ground and an elongated frame portion that extends transverse to the direction of travel, a plurality of rotatable soil-working members supported on corresponding upwardly extending shafts mounted on said portion and said shafts being positioned in a row that extends transverse to the direction of travel, said soil-working members each having a single downwardly extending tine, driving means connected to rotate said members and the corresponding tines about substantially vertical axes defined by said shafts, said tine of each soil-working member being driven through a circular path about its respective shaft to work a strip of land during travel, the spacing between the shafts of adjacent soil-working members exceeding the working width of the tine of either adjacent members, and said members being positioned to work strips of land spaced apart from one another between unworked strips, devices for depositing material on the worked strips being supported on said cultivator and each of said devices being positioned to the rear and in line with each said member, with respect to the direction of travel.

10. A cultivator as claimed in claim 9, wherein the tine of each member is eccentrically spaced from its corresponding shaft to work a strip of land that has a width substantially less than adjacent unworked strips of land.

* * * * *